United States Patent [19]
Kwon

[11] Patent Number: 5,283,602
[45] Date of Patent: Feb. 1, 1994

[54] OPTICAL SYSTEM FOR PROJECTOR

[75] Inventor: Soon H. Kwon, Kyungki, Rep. of Korea

[73] Assignee: Goldstar Co., Ltd., Rep. of Korea

[21] Appl. No.: 815,115

[22] Filed: Dec. 27, 1991

[30] Foreign Application Priority Data

Dec. 29, 1990 [KR] Rep. of Korea ............... 21875/1990
Sep. 27, 1991 [KR] Rep. of Korea ............... 16928/1991

[51] Int. Cl.⁵ .......................................... G03B 21/00
[52] U.S. Cl. ....................................... 353/69; 353/37; 353/34
[58] Field of Search ............. 353/69, 70, 98, 99, 353/119, 31, 34, 37; 359/873, 872, 871

[56] References Cited

U.S. PATENT DOCUMENTS

| | | | |
|---|---|---|---|
| 3,547,530 | 12/1970 | Poole | 353/98 |
| 4,002,408 | 1/1977 | Amma | 353/70 |
| 4,089,599 | 5/1978 | Kuboshima | 353/70 |
| 4,846,570 | 7/1989 | Kanai | 353/70 |
| 4,863,263 | 9/1989 | Kanai | 353/101 |
| 4,864,390 | 9/1989 | McKechnie et al. | 353/34 |
| 4,974,958 | 12/1990 | Yoshida | 353/69 |

Primary Examiner—William A. Cuchlinski, Jr.
Assistant Examiner—William C. Dowling
Attorney, Agent, or Firm—Blakely, Sokoloff, Taylor & Zafman

[57] ABSTRACT

An optical system for a projector which is capable of compensating the keystoning. The system comprises a light source, a light condensing part, a projected object, an image projecting part for focusing and projecting the image on a screen, and an optical path diversifying mirror. The optical path diversifying mirror is arranged as inclined at 45° angle of inclination with respect to the optical path of the light and also as being capable of parallel moving with the optical path toward or away from the projected object, thereby upwardly and downwardly projecting the image without occurrence of the keystoning on the screen. The present invention is applied for a three panel type of LCD projector comprising a plurality of projected objects, and an image projecting lens part for composing. The optical system of the LCD projector comprises at least one optical path diversifying mirror which is arranged in order to correspond to each projected object and also capable of moving in parallelism and also diversifying the optical path of the light. The optical system of this invention provides advantages in that it projects a clear image without occurrence of the keystoning on a screen disposed at a desired position regardless of the height of the projector and the screen.

1 Claim, 9 Drawing Sheets

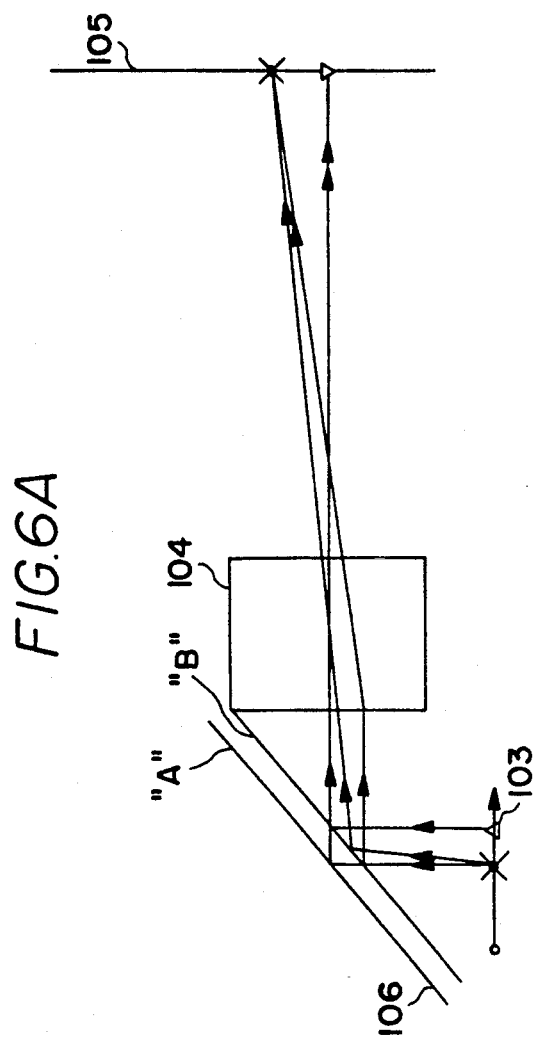

OPTICAL SYSTEM FOR PROJECTOR

BACKGROUND OF THE INVENTION

1. Field of the Invention

The present invention relates in general to an image projector, and more particularly to an optical system for such a projector which is capable of compensating the keystoning, in which keystoning the projected image on a screen appears as a reversed trapezoidal shape, thereby projecting an image without occurrence of the keystoning on the screen disposed at a desired height.

2. Description of the Prior Art

With reference to FIGS. 1 and 2 which show an optical system for a projector according to the prior art, the system comprises a light source 1 for emitting a light, a light condensing part 2 for condensing the light from the light source, a projected object 3 having an image thereon which is projected on a screen, an image projecting lens 4 for projecting the image of the object 3, and a screen 5 on which the image is projected.

Here, a planar display comprising a film and a liquid crystal is conventionally used as the object 3.

As represented in FIG. 1, the known projector has a construction in that the light source 1, the light condensing part 2, the projected object 3, the image projecting lens 4 are arranged on a common optical path, furthermore, the optical path is identical with the center axis of the image projected on the screen 5.

In projecting the image on the screen 5 by using the known projector, when the main light beam Bc transmitting through the centers of the object 3 and the image projecting lens 4 is directed in order to be perpendicular to the surface of the screen 5, that is, the center height of the projector is identical with the center height of the image on the screen 5, the keystoning does not occur. However, when the main light beam Bc is directed in order to be inclined with respect to the surface of the screen 5, that is, the center height of the projector is not identical with the center height of the image on the screen 5, the image is gradually defocused at upper part of the screen 5 so that there occurs the keystoning in that a reversed trapezoidal image reemerges on the screen 5 even though a rectangular-shaped projected object 3 is subject to be projected.

The keystoning due to the discordance of the center height between the projector and the image on the screen causes the quality of the image on the screen to be deteriorated, thereby resulting in a problem of deterioration of the image quality of the projection television system which is provided with the projector.

In an effort for solving the above problem of the occurrence of keystoning, the projector has to be horizontally located in order to identify the center height thereof with that of the image on the screen, thus the height of the screen is obliged to be limited by the installing height of the projector. In accordance, the projector is obliged to be conventionally installed at a relatively high position in order to identify the center height thereof with that of the screen which has to be conventionally positioned at a relatively high position.

In addition, there has been proposed another type of projector which is capable of compensating the keystoning. In this type of projector, the centers of the object 3 and the image projecting lens 4 are eccentrically arranged with respect to the main optical path of the projector as described in FIG. 3. Thus, this type of projector can compensate the keystoning, thereby causing the image projected on the screen 5 to have the shape which is identified with the shape of the projected object 3 and also is uniformly focused overall.

However, this type of projector which is capable of compensating the keystoning has a disadvantage in that the image reemerges as an upward tendency image on the screen, and the height at which the compensation for the keystoning is accomplished is limited by only one height, thereby inducing a considerable difficulty in compensating the keystoning of the image on the screen. Furthermore, a perfect compensation for the keystoning can not be accomplished.

In addition, as a technique in liquid crystal (LC) has been considerably advanced, the liquid crystal is in general used for the projector, that is, the liquid crystal display (LCD) projector which is provided for a projection color television system requiring a high quality of image and a large screen. However, the known LCD projector can not be efficiently used for the projection color television system because the television system has to frequently change the installing position thereof and also requires the same shaped image as that of the original image to reemerge on the screen.

FIG. 4 shows a representative example of the known LCD projector which is provided with three LCD panels and capable of compensating the keystoning of the image. As represented, the LCD projector has a compact construction and performs color light separation and color light composition.

The LCD projector comprises, as represented in FIG. 4, a white light source 10 for emitting a white light, a 45° inclined ultraviolet/infrared rays filter and mirror 11 which is arranged as inclined to an optical path of the light emitted from the source 10 at 45° angle of inclination, a vertical ultraviolet/infrared rays intercepting filter 12 which is vertically arranged on the optical path, a 45° inclined blue light filter 13 which is arranged as inclined to the optical path and capable of reflecting the red and green lights but transmitting the blue light, and a blue light reflection mirror or an inclined total reflection mirror 14 which is arranged on the optical path at a position opposite to the filter and mirror 11 in order to reflect the blue light from the blue light filter 13. Disposed on a reflection optical path from the blue light filter 13 is a 45° inclined green light reflection mirror 15 which reflects the green light but transmits the red light.

In addition, there are sequentially provided, on the reflection optical path started from the total reflection mirror 14, a light condensing lens 16 and a first monochrome LCD element 17, which element 17 is adapted for treating the blue light signal. A blue light filter or a green light reflection mirror 18 is arranged at a front of the first LCD element 17 in order to reflect the green light but transmit the blue light. Sequentially disposed on the reflection optical path started from the green light reflection mirror 15 are a condensing lens 19 and a second monochrome LCD element 20, which element 20 is adapted for treating the green light signal. A condensing lens 21 and a third monochrome LCD element 22 are arranged at a front of the green light reflection mirror 15, which element 22 is adapted for treating the red light signal.

A 45° inclined reflection mirror 23 is arranged at a front of the third monochrome LCD element 22. In addition, disposed at a cross point of the optical path from the total reflection mirror 23 and the optical path from the green light reflection mirror 18 is a red light filter 24 which is capable of transmitting the red light but reflecting the green and blue lights.

The total reflection mirror 23 and the red light filter 24 are arranged on the same optical path as inclined at 45° angle of inclination, respectively.

In addition, an image projecting lens 25 is arranged at a front of the red light filter 24 and projects an image on a screen 26 in order to reemerge thereon.

Here, a color light separating part of the known LCD projector comprises the blue light filter 13, the total reflection mirror 14, and the green light reflection mirror 15, while a color composition part of the LCD projector comprises the total reflection mirror 23, the red light filter 24 and the green light reflection mirror 18.

The operational effect of the known LCD projector having the above-mentioned construction is well known to the skilled in this art so that the detailed description for the operational effect of the known LCD projector will be efficiently omitted hereinafter.

In case of the known LCD projector which is capable of compensating the keystoning, the compensation for the keystoning is accomplished by upward movement of the optical path of the image projecting lens 25 in the same manner as described in the projector having one panel shown in FIGS. 1 to 3, thereby resulting in a disadvantage in that the extent of compensation for the keystoning is limited by the extent of the upward movement of the image projecting lens. In other words, when the arrangement of the known optical system of the LCD projector is accomplished, the extent of the upward movement of the image projecting lens is limited by the magnitude of the projector such as size of the optical system thereof, thus, the extent of the compensation for the keystoning is obliged to be limited to a narrow extent.

SUMMARY OF THE INVENTION

It is, therefore, an object of this invention to provide an optical system of a projector in which the above-mentioned disadvantages can be overcome and which is provided with a mirror which is disposed between a projected object and an image projecting lens and capable of moving parallel to the optical path between the projected object and the mirror, thereby completely compensating the keystoning of the image projected on a screen disposed at a desired position regardless of the height.

It is another object of this invention to provide an LCD projector which is suited for a projection color television system which requires to provide a large screen and an image of high quality and also has no positional limit in installing.

In one embodiment, the above-mentioned objects of the present invention can be accomplished by providing an optical system for a projector comprising: a light source for emitting a light, a light condensing part for condensing the light emitted from the light source, a projected object arranged on the same optical path as that of the light condensing part, an image projecting part for focusing and projecting the image of the projected object on a screen, and an optical path diversifying mirror which is disposed between the projected object and the image projecting part and capable of diversifying the optical path of the light emitted from the light source.

The optical path diversifying mirror is arranged as inclined at 45° angle of inclination with respect to the optical path of the light and also as being capable of parallel moving with the optical path toward or away from the projected object, thereby upwardly and downwardly projecting the image of light which has been transmitted through the projected object on the screen by the image projecting lens, thus accomplishing compensation for the keystoning of the image on the screen.

In another embodiment, the objects of this invention can be accomplished by providing in a three panel type of projector comprising an optical system including a plurality of projected objects each having a video information for red, green or blue light, and an image projecting lens part for composing the image information of the respective projected object, said optical system further comprising: at least one optical path diversifying mirror which is arranged in order to correspond to each projected object and also capable of moving in parallelism and also diversifying the optical path of the light.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 show an embodiment of a known optical system of a projector according to the prior art, in which:

FIG. 1 is a schematic view showing a construction of the optical system; and

FIG. 2 is a schematic view of the optical system of FIG. 1 for showing the keystoning of an image projected on a screen;

FIGS. 5 to 8 show an optical system of a projector according to the present invention, in which:

FIG. 5 is a schematic view of an optical system for showing the structural principle of the projector;

FIG. 6 is a schematic view of the optical system for showing the compensation for the keystoning of an image projected on a screen; and FIG. 7 is a schematic view showing the structural principle of the optical system of the present invention;

FIG. 8 is a schematic view of an optical system for showing the principle of compensation for the keystoning according to the present invention.

DESCRIPTION OF THE PREFERRED EMBODIMENTS

Figure 5:
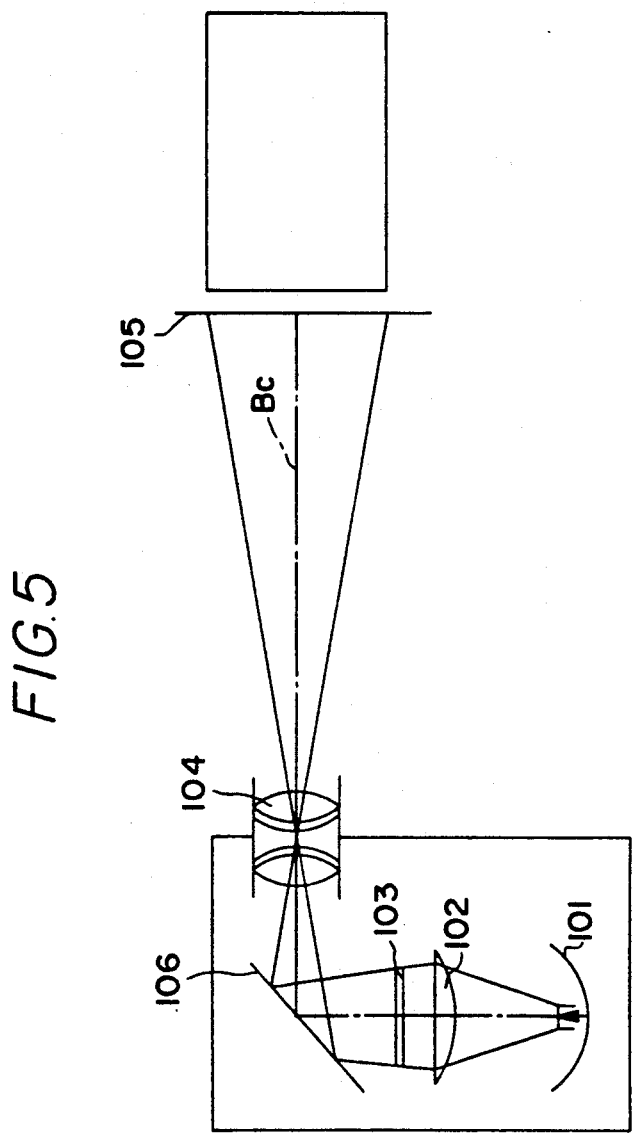

Referring first to FIG. 5 which shows the structural principle of an optical system of a projector according to this invention, the optical system comprises a light source 101 for emitting a light, a light condensing part 102 and a projected object 103 sequentially arranged on an optical path of the light emitted from the light source 101, respectively, and a mirror 106 which is arranged at a front of the projected object 103 at an angle of inclination of 45° in order to diversify the advancing direction of the light emitted from the light source 101, that is, the optical path of the light. Disposed on a reflection optical path started from the mirror 106 is an image projecting lens 104 for projecting an image of the object 103 onto a screen 105 in order to cause the image to reemerge on the screen 105.

In the above optical system, the mirror 106 is arranged in order to move parallel to the optical path between the object 103 and the mirror 106. When the mirror 106 is moved up or down the optical path, the directions of the normal lines of the mirror 106 at various positions are parallel to each other. Thus, if the mirror 106 moves in parallelism toward the object 103 along the optical path, the lens center of the image projecting lens 104 is gradually diversified in order to be located at an upper position with respect to the center of object 103, thereby providing an upward projection of the image.

The mirror 106 can be easily accomplished in the parallel movement thereof along the optical path by means of a conventional driving device generally comprising slide guide rails, screws and the like, however, the driving device may comprise another type without departing from the scope of this invention. Thus, the construction and the operation of the driving device can be efficiently omitted.

Hereinafter, the compensation for the keystoning of the image reemerging on the screen will be described in detail.

In FIG. 5, screen 105 is located on the center axis "X" of the image projecting lens 104, that is, the incident angle and the reflection angle of the main light Bc with respect to the mirror 106 are 45°, respectively, thus, the keystoning of the image on the screen 105 does not occur.

Figure 6:
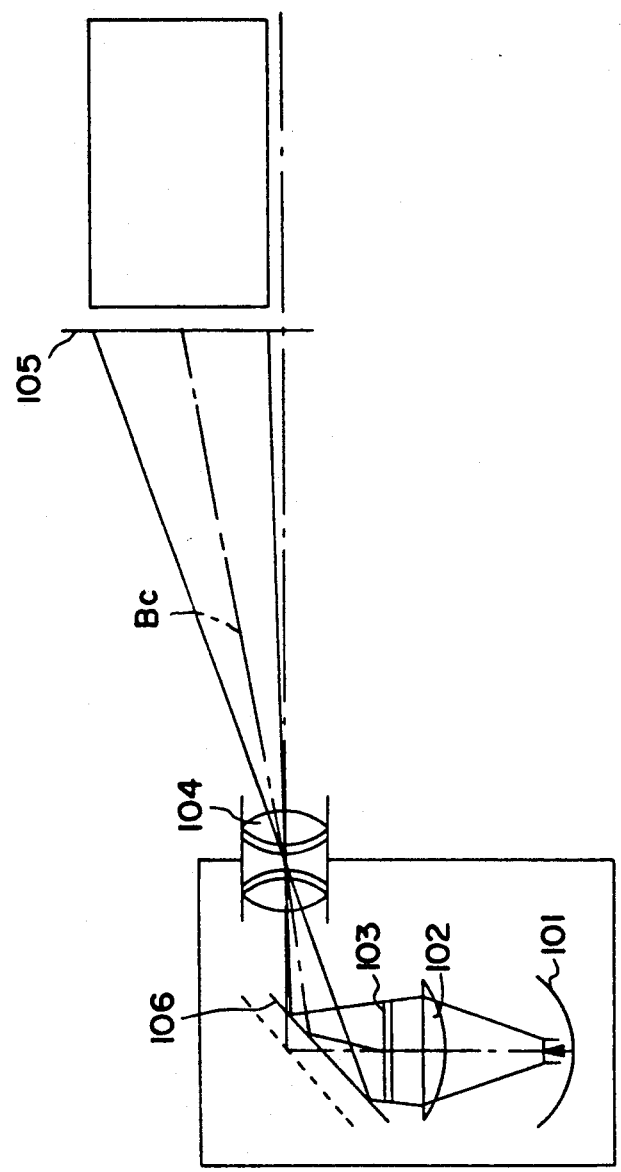

Turning next to FIG. 6 which shows the compensation for the keystoning of the image in this optical system, the optical system projects the image upwardly by downward movement of the mirror 106 in order to control the effective incident angle and the effective reflection angle of the main light Bc with respect to the mirror 106 to be more than 45° angle.

In this upward projection, the light emitted from the light source 101 is first condensed by the light condensing part 102, then transmitted through the projected object 103, thereafter, received by the mirror 106 at an incident angle being more than 45° angle in order to be reflected by the mirror 106 at an effective reflection angle being more than 45° angle. Thus, the light reflected by the mirror 106 is then transmitted through the image projecting lens 104, thereby causing the projector to upwardly project the image on the screen 105 which is located at a relatively higher position than that of the center axis "X" of the image projecting lens 104.

FIG. 6A provides further explanation of the operation of the optical system. When the mirror is in position "A", the object point which is reflected on to the center of the image projecting lens 104 occurs at point X. When the mirror 106 is moved down to position "B", the object point Δ is reflected through the center of the lens on to the screen at the position previously occupied by the image of object point X when the mirror was in position "A". With the mirror in position "B", object point X is reflected off of mirror 106 on to a lower part of lens 104, which results in image point X being refracted through the lower part of lens 104 and then projected on to the screen 105 at a higher position. As a result, the image has been moved upward without keystoning.

Thus, the optical system of the projector according to this invention provides a clear image projected on the screen 105 by upward and downward movement of the mirror 106 without occurrence of the keystoning. Furthermore, the height at which the keystoning can be efficiently compensated is not limited, thereby obtaining a desired clear image reemerging on the screen disposed at any position without occurrence of the keystoning regardless of the height of the screen 105.

Even though it has been described that the mirror 106 is arranged on the optical path of the light emitted from the light source 101 as inclined at 45° angle of inclination, the skilled in this art will know that the angle of inclination of the mirror 106 may change in accordance with diversification of the relative position between the light source 101 and the image projecting lens 104.

The principle of the compensation for the keystoning according to this invention will be described in detail in conjunction with FIGS. 7 and 8.

Figure 7:
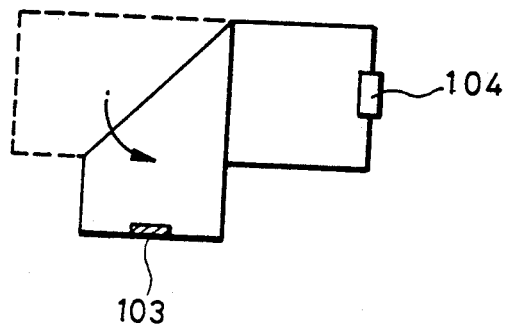

As shown in FIG. 7, when the object 103 and the image projecting lens 104 are folded on the basis of the mirror 106, the light source 101, the condensing part 102, the projected object 103 and the image projecting lens 104 are arranged on a straight line, respectively, as represented at the phantom line of FIG. 7.

The shape of the image when the light which was condensed by the condensing part 102 then has been transmitted through the object 103 is last transmitted through the image projecting lens 104, in case of the arrangement represented at the solid line of FIG. 7, is the same as that of the image when the light which was condensed by the condensing part 102 then has been transmitted through the object 103 is last transmitted through the image projecting lens 104, in case of the arrangement represented at the phantom line of FIG. 7.

Figure 8:
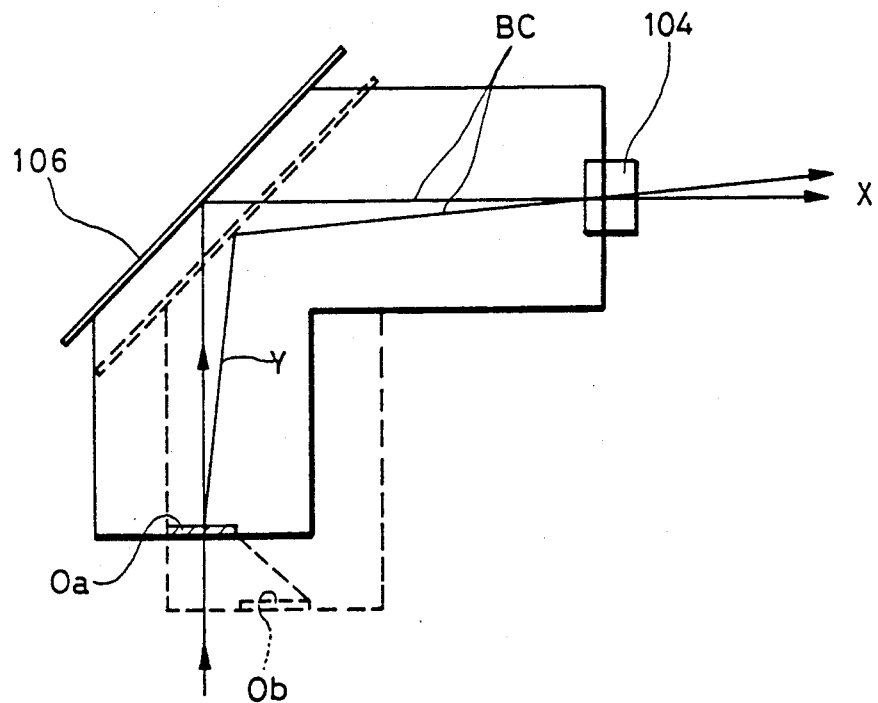

On the other hand, when the mirror 106 is adjusted as downward moving as shown at the phantom line of FIG. 8, the optical path of the main light Bc is diversified with respect to the common center axis "Y" of the light source 101, the condensing part 102 and the projected object 103 and also with respect to the center axis "X" of the image projecting lens 104. Thus, the light passes along a new optical path in which the effective incident and reflection angles of the light with respect to the mirror 106 are more than 45° angle, respectively. thereby accomplishing the upward projection of the image onto the screen 105.

At this time, the true projected object Oa is projected as if it were displaced to a position of an assumed projected object Ob, thereby making it possible to obtain a clear image without occurrence of the keystoning.

The lower the mirror 106 gradually moves, the higher the projected position of the image is accomplished, thereby causing a clear image without occurrence of the keystoning to be projected on the screen 105 which is disposed at a higher position than that of the projector.

Figure 9:
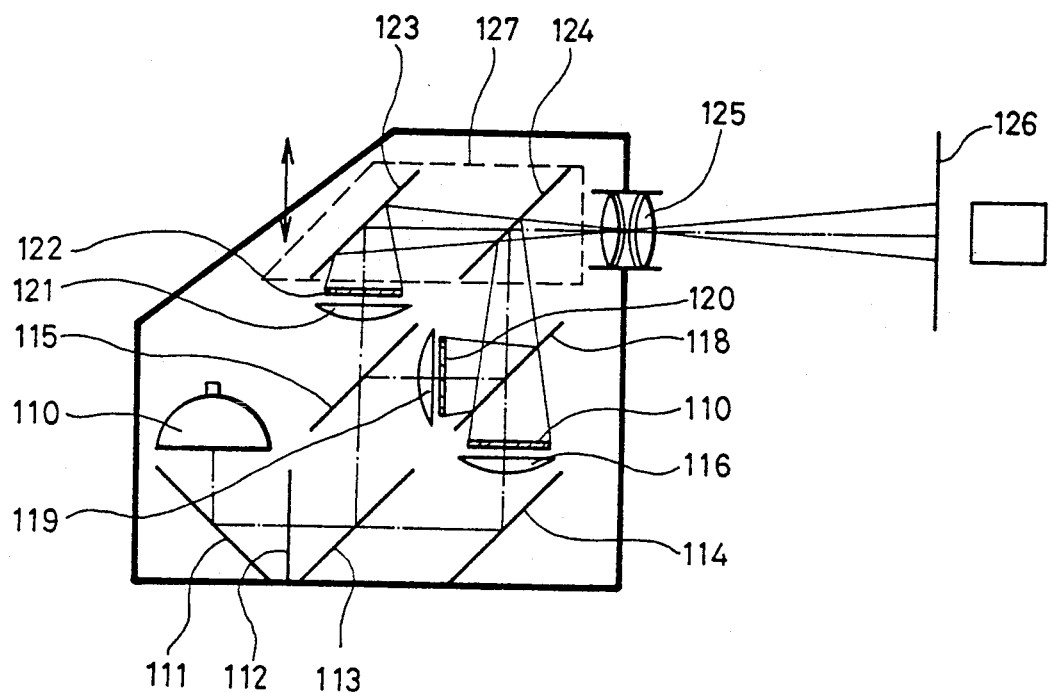
FIG. 9 is a view corresponding to FIG. 4, but showing the present invention.

FIG. 9 is a schematic view showing an optical system of a LCD projector having three LCD panels in accordance with this invention, in which LCD projector the keystoning of the image is compensated by the same method as that of FIG. 6.

Figure 1:
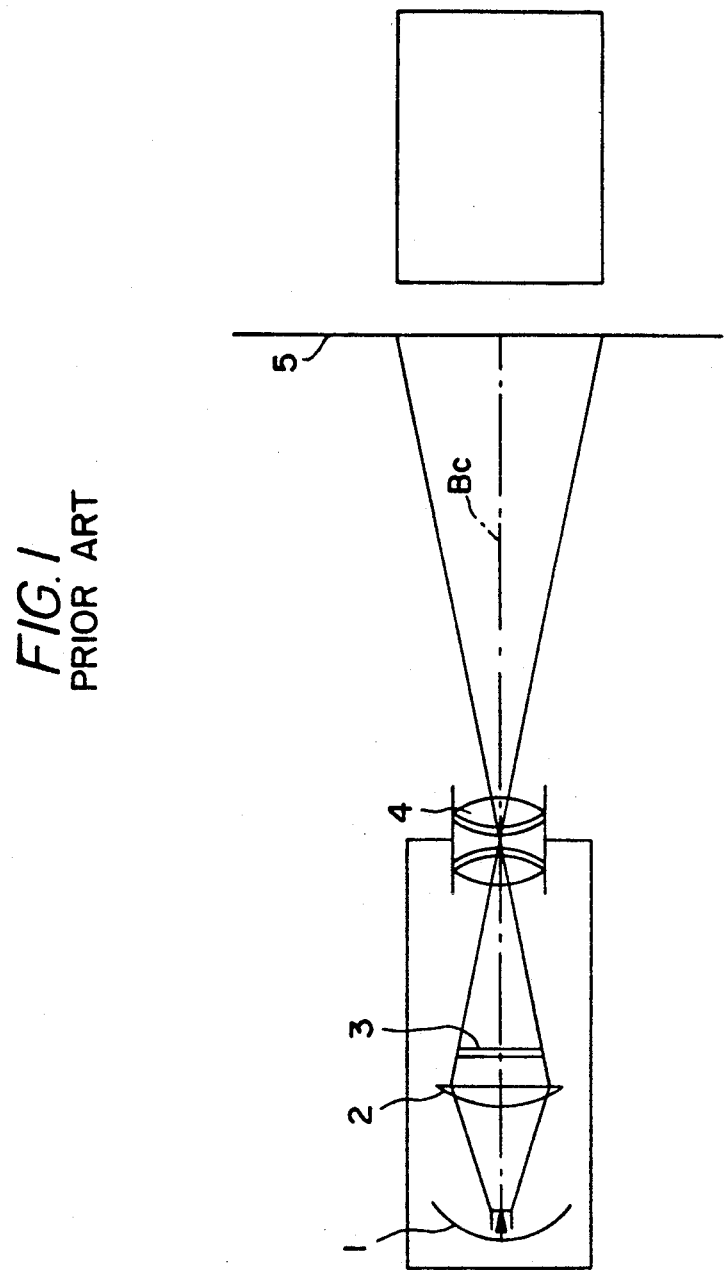
Figure 2:
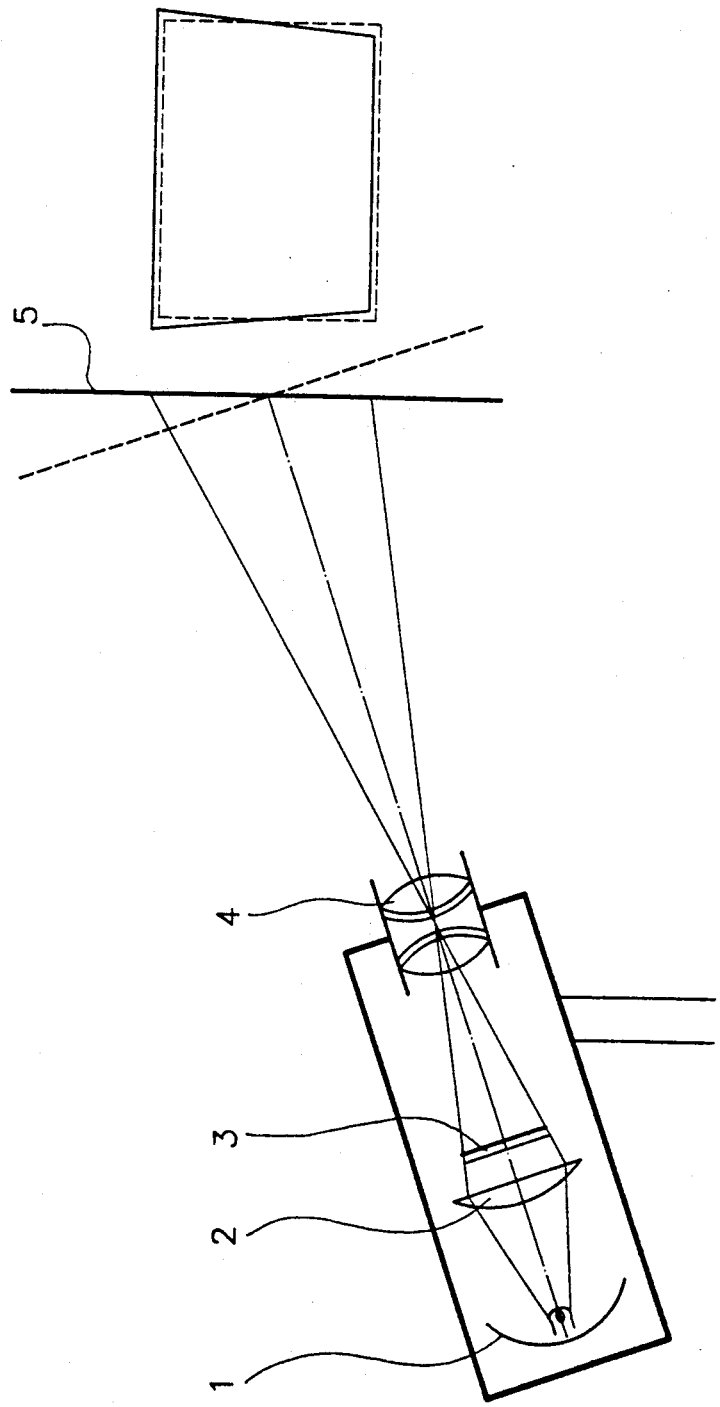
Figure 3:
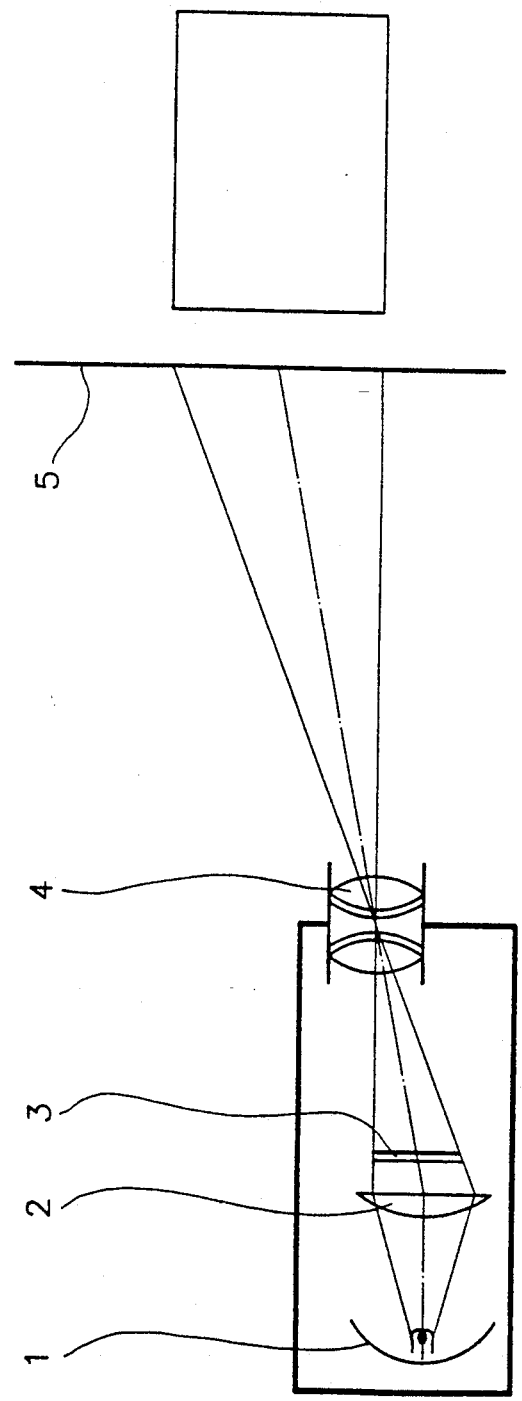
FIG. 3 is a schematic view showing the optical system of the projector of FIGS. 1 and 2 in which the keystoning of the image is compensated.
Figure 4:
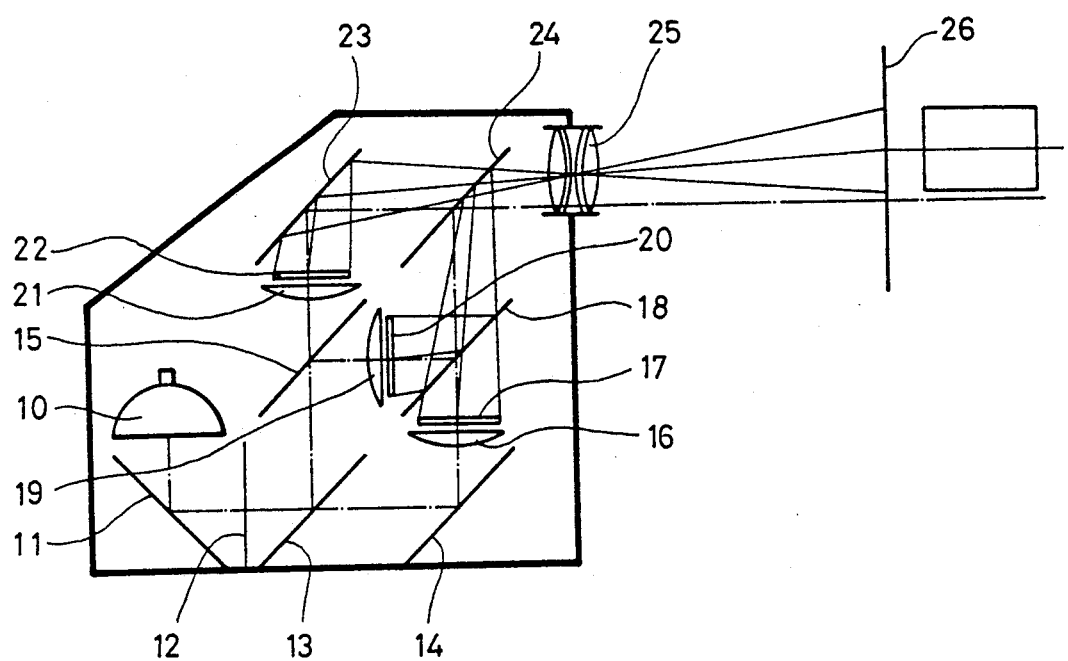
FIG. 4 is a schematic view showing an optical system of a known LCD projector having three LCD panels in which the keystoning of the image is compensated by the same method as that of FIG. 3.

The three panel type of projector of FIG. 9 has the optical system of the same construction as that of the conventional projector shown in FIG. 4.

As represented, the LCD projector comprises a light source 110 for emitting a white light, a 45° inclined ultraviolet/infrared rays filter and mirror 111 which is arranged as inclined with respect to an optical path of the light from the source 110 at 45° angle of inclination, a vertical ultraviolet/infrared rays intercepting filter 112 which is vertically arranged on the optical path, a 45° inclined blue light filter 113 which is arranged as inclined with respect to the optical path and capable of reflecting the red and green lights but transmitting the blue light, and an inclined total reflection mirror (a blue light reflection mirror) 114 which is arranged on the optical path at a position opposite to the filter and mirror 111 in order to reflect the blue light from the blue light filter 113. Disposed on a reflection optical path from the blue light filter 113 is a 45° inclined green light reflection mirror 115 which reflects the green light but transmits the red light.

In addition, there are sequentially provided, on the reflection optical path started from the total reflection mirror 114, a condensing lens 116 and a first monochrome LCD element 117, which element 117 is adapted for treating the blue light signal. A blue light filter or a green light reflection mirror 118 is arranged at a front of the LCD element 117 in order to reflect the green light thereby but transmit the blue light therethrough. Sequentially disposed on the reflection optical path started from the green light reflection mirror 115 are a light condensing lens 119 and a second monochrome LCD element 120, which element 120 is adapted for treating the green light signal. A light condensing lens 121 and a third monochrome LCD element 122 are arranged at a front of the green light reflection mirror 115, which element 122 is adapted for treating the red light signal.

A 45° inclined reflection mirror 123 is arranged at a front of the third monochrome LCD element 122. In addition, disposed at a cross point of the optical path started from the total reflection mirror 123 and the optical path started from the green light reflection mirror 118 is a red light filter 124 which is capable of transmitting the red light but reflecting the green and blue lights.

The total reflection mirror 123 and the red light filter 124 are arranged on the same optical path as inclined at 45° angle of inclination, respectively.

In addition, an image projecting lens 125 is arranged at a front of the red light filter 124 and projects an image on a screen 126 in order to reemerge the image thereon.

Of course, the angle of inclination of the total reflection mirror 123 and the red light filter 124 may change in accordance with diversification of the relative position between the light source 110 and the image projecting lens 125.

In this three panel type projector, the total reflection mirror 123 and the red light filter 124 which are arranged on the optical path move in parallelism with respect to the monochrome LCD elements 117, 120 and 122 at the same time in order to compensate the keystoning.

Thus, the image can be upwardly or downwardly projected on the screen 126 under the condition that the keystoning is completely compensated owing to the parallel movement of the total reflection mirror 123 and red light filter 124 with respect to the monochrome LCD elements 117, 120 and 122.

The total reflection mirror 123 and red light filter 124 are mounted on a carrier 127, respectively, in order to move in parallelism at the same time. The carrier 127 is driven by means of a conventional driving device generally comprising slide guide rails, screws and the like and also controlled by means of a conventional controller. Here, the conventional construction and operation of the carrier 127 are well known to the skilled in this art, thus the detailed description thereof will be efficiently omitted hereinafter.

During the movement of the carrier 127, the optical characteristics between the projected object and the image projecting lens 125 are maintained without change, thereby causing the three color images, that is, the red, green and blue color images to be projected on the screen 105 without change in color.

As described above, the present invention provides an optical system of a projector having advantages in that it projects a clear image without occurrence of the keystoning on a screen disposed at a desired position regardless of the installing height of the projector and also the height of the screen, furthermore, it is suited for a projection color television system which generally requires to provide a large screen, high quality of image and also diversification of the installing position thereof.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An optical system of a projector comprising:
   a light source for emitting a light;
   light separating means for separating said light emitted from said light source into red, green and blue color lights;
   light condensing means for condensing said color lights from said light separating means;
   color signal treating means for treating the condensed color lights from said light condensing means in accordance with red, green and blue color signals;
   light composing means for composing the color lights from said color signal treating means; and
   image projecting means for projecting the color lights from said light composing means on a screen in order to cause a color image to reemerge on said screen,
   wherein said light composing means comprises:
   a first light composing part comprising a mirror being capable of filtering said color light; and
   a second light composing part comprising a total reflection mirror and a light filtering mirror being capable of functioning as a light filter,
   wherein said total reflection mirror and said filtering mirror of the second light composing part are arranged as inclined at an angle of inclination, which angle is determined in accordance with a relative position between said light separating means and said image projecting means,
   wherein said second light composing part is capable of moving parallel to the optical path of the light source and the light condensing means in correspondence to a projection angle of said image projecting means with respect to said screen.

* * * * *

UNITED STATES PATENT AND TRADEMARK OFFICE
CERTIFICATE OF CORRECTION

PATENT NO. : 5,283,602
DATED : February 1, 1994
INVENTOR(S) : Soon H. Kwon

It is certified that error appears in the above-indentified patent and that said Letters Patent is hereby corrected as shown below:

```
In column 5 at line 47 before "incident"
     insert --effective--.
```

Signed and Sealed this

Twenty-third Day of May, 1995

Attest:

BRUCE LEHMAN

*Attesting Officer*         *Commissioner of Patents and Trademarks*